(12) United States Patent
Park et al.

(10) Patent No.: US 9,858,297 B2
(45) Date of Patent: Jan. 2, 2018

(54) SYSTEM FOR SEARCH AND METHOD FOR OPERATING THEREOF

(71) Applicant: HANWHA TECHWIN CO., LTD., Changwon-si (KR)

(72) Inventors: Dong Jun Park, Changwon-si (KR); Yeon Geol Ryu, Changwon-si (KR); Hak Chul Shin, Changwon-si (KR); Dong Whan Jung, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 571 days.

(21) Appl. No.: 14/340,114

(22) Filed: Jul. 24, 2014

(65) Prior Publication Data
US 2015/0117759 A1    Apr. 30, 2015

(30) Foreign Application Priority Data
Oct. 25, 2013 (KR) .......................... 10-2013-0128036

(51) Int. Cl.
*G06F 17/30* (2006.01)
(52) U.S. Cl.
CPC ................ *G06F 17/3028* (2013.01)
(58) Field of Classification Search
CPC .......... G06K 9/66; G06K 9/52; G06F 17/301; G06F 17/302
See application file for complete search history.

(56) References Cited

U.S. PATENT DOCUMENTS

| | | | | |
|---|---|---|---|---|
| 5,969,755 A * | 10/1999 | Courtney | ............ | G06F 17/3079 348/135 |
| 6,611,609 B1 * | 8/2003 | Zhu | .................... | G06F 17/30244 345/589 |
| 6,625,311 B1 * | 9/2003 | Zhu | .................... | G06F 17/30244 382/173 |
| 6,629,107 B1 * | 9/2003 | Ouchi | .................. | G06F 17/3002 |
| 6,731,788 B1 * | 5/2004 | Agnihotri | ......... | G06F 17/30796 194/206 |
| 7,136,710 B1 * | 11/2006 | Hoffberg | ............... | G06F 3/0482 382/155 |
| 7,562,076 B2 | 7/2009 | Kapur | | |
| 7,627,199 B2 | 12/2009 | Sato et al. | | |

(Continued)

FOREIGN PATENT DOCUMENTS

| | | |
|---|---|---|
| JP | 07-325832 A | 12/1995 |
| KR | 10-2007-0007031 A | 1/2007 |
| KR | 10-2013-0060766 A | 6/2013 |

*Primary Examiner* — Chan Park
*Assistant Examiner* — Mia M Thomas
(74) *Attorney, Agent, or Firm* — Sughrue Mion, PLLC

(57) ABSTRACT

Provided are a system for search and a method for operating thereof. The system for search includes: a preliminary data analysis part which extracts a variety of attributes through analysis of images being input, analyzes a trend about a category as information requested by a client with the image analysis result, and stores the trend analysis result as metadata; an index part which stores the image analysis result, and structuralizes, organizes and stores the stored metadata in order to easily search the metadata; and a search part which extracts trend information matching a category input by a client, from the index part and provides the trend information in a predetermined format.

18 Claims, 13 Drawing Sheets

(56) References Cited

U.S. PATENT DOCUMENTS

| | | | | |
|---|---|---|---|---|
| 7,908,272 B2* | 3/2011 | Chang | G06K 19/06028 | |
| | | | | 707/736 |
| 8,219,594 B2* | 7/2012 | Ono | G06F 17/30259 | |
| | | | | 382/175 |
| 8,310,542 B2* | 11/2012 | Girgensohn | G08B 13/19613 | |
| | | | | 348/143 |
| 8,532,981 B2* | 9/2013 | Brun | G06F 17/2735 | |
| | | | | 704/10 |
| 8,583,637 B2* | 11/2013 | Berkner | G06F 17/30554 | |
| | | | | 382/298 |
| 8,589,973 B2* | 11/2013 | Chen | H04L 29/06027 | |
| | | | | 705/26.1 |
| 8,600,796 B1* | 12/2013 | Sterne | G06Q 30/0201 | |
| | | | | 705/7.29 |
| 8,818,788 B1* | 8/2014 | Mihalik | G06F 17/2785 | |
| | | | | 704/1 |
| 8,862,582 B2* | 10/2014 | Blewett | G06F 17/30265 | |
| | | | | 382/154 |
| 9,177,554 B2* | 11/2015 | Bhatt | G10L 15/26 | |
| 9,443,245 B2* | 9/2016 | Sun | G06Q 30/02 | |
| 2002/0006266 A1* | 1/2002 | Yoon | G11B 27/034 | |
| | | | | 386/239 |
| 2002/0131625 A1* | 9/2002 | Vining | G06F 17/30256 | |
| | | | | 382/128 |
| 2005/0135662 A1* | 6/2005 | Vining | G06F 17/30256 | |
| | | | | 382/128 |
| 2008/0133697 A1* | 6/2008 | Stewart | H04M 1/72522 | |
| | | | | 709/217 |
| 2008/0159585 A1* | 7/2008 | True | G06K 9/00456 | |
| | | | | 382/100 |
| 2009/0016599 A1* | 1/2009 | Eaton | G06K 9/00335 | |
| | | | | 382/159 |
| 2009/0141932 A1* | 6/2009 | Jones | G06K 9/036 | |
| | | | | 382/100 |
| 2009/0160859 A1* | 6/2009 | Horowitz | G06T 11/206 | |
| | | | | 345/440 |
| 2009/0217315 A1* | 8/2009 | Malik | G06K 9/00362 | |
| | | | | 725/9 |
| 2011/0078157 A1* | 3/2011 | Sun | G06F 17/30867 | |
| | | | | 707/749 |
| 2011/0229035 A1* | 9/2011 | Sohma | G06K 9/00469 | |
| | | | | 382/176 |
| 2012/0054194 A1* | 3/2012 | Gao | G06F 17/30964 | |
| | | | | 707/741 |
| 2012/0150888 A1* | 6/2012 | Hyatt | G06F 17/30528 | |
| | | | | 707/758 |
| 2012/0245923 A1* | 9/2012 | Brun | G06F 17/2735 | |
| | | | | 704/9 |
| 2013/0027300 A1* | 1/2013 | Nakasu | G06F 3/017 | |
| | | | | 345/158 |
| 2013/0300750 A1* | 11/2013 | Mishra | G06T 13/00 | |
| | | | | 345/474 |
| 2014/0072206 A1* | 3/2014 | Eaton | G06K 9/00335 | |
| | | | | 382/159 |
| 2014/0219571 A1* | 8/2014 | Bhatt | G10L 15/26 | |
| | | | | 382/229 |
| 2014/0250126 A1* | 9/2014 | Baldwin | G06F 17/3028 | |
| | | | | 707/737 |
| 2014/0270494 A1* | 9/2014 | Sawhney | G06K 9/00979 | |
| | | | | 382/159 |
| 2014/0282733 A1* | 9/2014 | Okumura | H04N 5/44543 | |
| | | | | 725/46 |
| 2014/0376792 A1* | 12/2014 | Matsuzaki | A61B 1/00009 | |
| | | | | 382/128 |
| 2015/0062176 A1* | 3/2015 | Milam | G09G 5/14 | |
| | | | | 345/641 |
| 2015/0269143 A1* | 9/2015 | Park | G06F 17/30274 | |
| | | | | 382/305 |
| 2015/0310624 A1* | 10/2015 | Bulan | G06K 9/66 | |
| | | | | 382/103 |
| 2016/0007008 A1* | 1/2016 | Molgaard | H04N 5/23212 | |
| | | | | 348/47 |
| 2016/0124071 A1* | 5/2016 | Baxley | G01S 5/0263 | |
| | | | | 348/143 |
| 2016/0132124 A1* | 5/2016 | Nakamura | G06K 9/00355 | |
| | | | | 345/156 |
| 2016/0148072 A1* | 5/2016 | Chan | G06K 9/00536 | |
| | | | | 382/104 |
| 2016/0182940 A1* | 6/2016 | Assayag | H04N 21/4312 | |
| | | | | 725/62 |
| 2017/0024899 A1* | 1/2017 | Hammoud | H04W 4/025 | |
| 2017/0039709 A1* | 2/2017 | Yaguchi | A61B 1/00009 | |
| 2017/0178352 A1* | 6/2017 | Harmsen | G06T 7/579 | |

* cited by examiner

SYSTEM FOR SEARCH AND METHOD FOR OPERATING THEREOF

CROSS-REFERENCE TO RELATED APPLICATION

This application claims the benefit of Korean Patent Application No. 10-2013-0128036, filed on Oct. 25, 2013, in the Korean Intellectual Property Office, the disclosure of which is incorporated herein by reference in its entirety.

BACKGROUND

1. Field

One or more exemplary embodiments of the present disclosure relate to a system for search and a method for operating thereof, and more particularly, to a system for search which identifies contents formed in data, analyzing a trend, and providing the trend to a client, and a method for operating thereof.

2. Description of the Related Art

General search systems provide specialized searches to return a search result to a client. For example, when a client searches for classification information related to people and/or vehicles in image data, general search systems form category information by using an image analysis algorithm capable of generating the classification information, and the client retrieves information from a specified category. That is, related art search systems use processes for analyzing a client's requirements and finding items. The formation of such a search system is disclosed in Korean Patent Laid-Open Publication No. 2007-0007031 and Japanese Patent Laid-Open Publication No. 1995-325832.

SUMMARY

One or more exemplary embodiments of the present disclosure include a search system and method of operating the system, which uses semantic technologies and ontology to identify contents formed in data, analyze a trend, and provide the trend to a client. In contrast, the related art uses processes for analyzing the requirement of a client and finding items.

Additional aspects will be set forth in part in the description which follows and, in part, will be apparent from the description, or may be learned by practice of the presented exemplary embodiments.

According to one or more exemplary embodiments of the present disclosure, a system for search includes: a preliminary data analysis part configured to analyze input images to extract a variety of attributes, analyze a trend about a category of information requested by a client by using the variety of extracted attributes, and store the trend analysis as metadata; an index part configured to make the metadata searchable by structuralizing and storing the metadata; and a search part configured to extract trend information matching the category of information requested by the client from the searchable metadata and provide the trend information in a predetermined format.

The preliminary data analysis part may include: an image analysis engine configured to analyze the input images and extract the variety of attributes; a trend analysis engine configured to analyze the trend about the category of information requested by the client and provide the trend analysis, in response to the attribute information being extracted; and a first storage unit configured to store the trend analysis as metadata.

The trend analysis engine may include: an occurrence frequency analysis unit configured to analyze, as first trend information, an occurrence frequency of the category in a random time period; a change analysis unit configured to provide second trend information, by analyzing a change in the first trend information; and a movement line analysis unit configured to provide, as third trend information, a result of movement line analysis of the category, through detection and tracking of a motion in the category.

The search part may be configured to provide metadata of the first trend information in an output screen format that includes upper categories indicated on one axis and, on another axis, visual graphics representing frequencies of occurrences of lower categories included in each upper category.

In response to a random lower category being selected from among the lower categories, detailed information of the selected lower category may be displayed.

The search part may be configured to provide metadata of the second trend information, in a heat-map format in which a change in occurrence frequencies with respect to a set time is expressed in visual graphics of a heat distribution form.

The search part may be configured to provide metadata from changing the first trend information to second trend information, in a graph format in which a change in occurrence frequencies with respect to a set time is expressed in visual graphics.

The movement line analysis unit may include: a movement line information generation unit configured to generate movement line information through motion detection and tracking in relation to the category from the input image frames; a noise removing unit configured to remove noise of the movement line information; a clustering unit configured to make clusters each of which is formed of similar movement line information items in which noise is removed; and a grouping unit configured to provide, as the third trend information, a result of grouping similar movement line information items by performing artificial intelligence neural network learning with the clustered movement line information items.

The search part may be configured to provide metadata of the third trend information, which is retrieved from the index part, in an output screen format which is formed with a first area where a movement line in the image is displayed and a second area where the result of grouping similar movement line information items by performing artificial intelligence neural network learning is displayed as a self-organizing map.

In response to any one group being selected in the second area, a movement line corresponding to the selected group is displayed in the first area.

The movement line analysis unit may include: a movement line information generation unit configured to generate movement line information through motion detection and tracking in relation to the category from the input image frames; a noise removing unit configured to remove noise of the movement line information; a point selection unit configured to select arbitrary points included in the movement line information in which noise is removed; a clustering unit configured to make clusters each of which is formed of similar movement line information items including the points; and a movement probability calculation unit configured to calculate a probability of moving from any one clustered point to another clustered point, and provide the probability as the third trend information.

Metadata of the third trend information metadata retrieved from the index part may be provided in an output screen format in which the clustered points in the image are displayed and the probability of moving from any one clustered point to another clustered point is shown as an arrow.

The magnitude of the probability of moving may be proportional to a size of the arrow.

The index part may include: a second storage unit configured to store an output of the image analysis engine; an indexing engine configured to structuralize and organize metadata stored in the first storage unit in order to make the metadata searchable; and a third storage unit configured to store the searchable metadata from the indexing engine.

The index part may include: a query engine configured to classify a search word input from the client into a category; a search engine configured to search the second and third storage units for trend information corresponding to the classified category; and a browsing engine configured to provide the search result of the trend information by the search engine in a predetermined format.

According to one or more exemplary embodiments of the present disclosure, a method for operating a system for search may include: extracting, for preliminary data analysis, a variety of attributes by analyzing input images, analyzing a trend about a category of information requested by a client by using the variety of extracted attributes, and storing the trend analysis as metadata; indexing the stored metadata by structuralizing and storing the stored metadata in order to make the metadata searchable; and extracting, from the searchable metadata, trend information matching a category input by a client, and providing the extracted trend information in a predetermined format.

The extracting of the variety of attributes and the analyzing the trend about the category comprises: extracting the variety of attributes through analysis of the input images; and in response to the variety of attributes being extracted, analyzing the trend about the category and providing the trend analysis as trend information.

Analyzing the trend about the category and providing the trend analysis comprises: analyzing, as first trend information, an occurrence frequency of the category in a random time period; analyzing, as second trend information, a change in the first trend information; and providing, as third trend information, a result of movement line analysis of the category, through detection and tracking of a motion in the category.

The providing of a result of movement line analysis may include: generating movement line information through motion detection and tracking in relation to the category from the input images; removing noise of the movement line information; making clusters each of which is formed of similar movement line information items in which noise is removed; and providing, as the third trend information, a result of grouping similar movement line information items by performing artificial intelligence neural network learning with the clustered movement line information items.

The providing of a result of movement line analysis may include: generating movement line information through motion detection and tracking in relation to the category from the input images; removing noise of the movement line information; selecting arbitrary points included in the movement line information in which noise is removed; making clusters each of which is formed of similar movement line information items including the points; and calculating a probability of moving from any one clustered point to another clustered point, and providing the probability as the third trend information.

As described above according to the present disclosure, the search system identifies contents formed in data, analyzes a trend, and provides the trend to a client. Accordingly, the client can identify a search result more intuitively.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
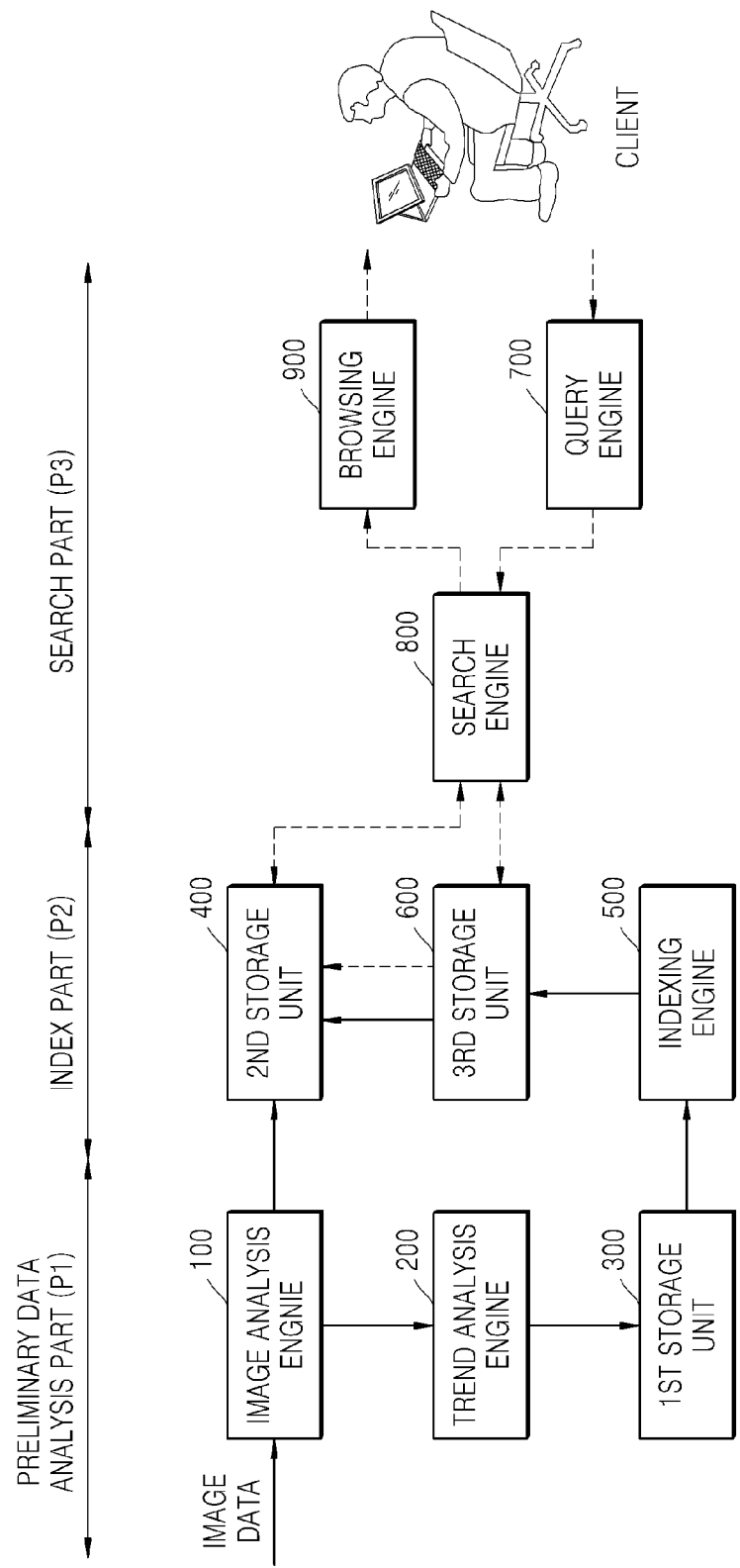
FIG. 1 is a block diagram showing the structure of a search system according to an exemplary embodiment of the present disclosure.

As the disclosure allows for various changes and numerous embodiments, particular exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the disclosure.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Exemplary embodiments of the present disclosure will be described below in more detail with reference to the accompanying drawings. Those components that are the same or are in correspondence are rendered the same reference numeral regardless of the figure number, and redundant explanations are omitted.

FIG. 1 is a block diagram showing the structure of a search system according to an exemplary embodiment of the present disclosure. Referring to FIG. 1, the search system includes a preliminary data analysis part (P1), an index part (P2), and a search part (P3).

The preliminary data analysis part (P1) extracts a variety of attributes through analysis of images being input, analyzes a trend about a category as information requested by a client with the image analysis result, and stores the trend analysis result as metadata. The preliminary data analysis part (P1) includes an image analysis engine 100, a trend analysis engine 200, and a first storage unit 300.

The index part (P2) stores the image analysis result, and structuralizes, organizes and stores the stored metadata in order to easily search the metadata. The index part (P2) includes a second storage unit 400, an indexing engine 500 and a third storage unit 600.

The search part (P3) extracts trend information matching a category input by a client, from the index part (P2) and provides the trend information in a predetermined format. The search part (P3) includes a query engine 700, a search engine 800 and a browsing engine 900.

The image analysis engine 100 extracts a variety of attributes through analysis of image data being input. The image data being input may be image data, which is transmitted from a camera (not shown) connected to the search system, image data stored in a digital video recorder (DVR) or a network video recorder (NVR) connected to the search system, image data input through a variety of paths through a network (not shown), etc.

Also, the image analysis engine 100 may perform image analysis, including adding and removing an object in an image, tracking of an image of an object similar to a predetermined image input by a client, detection of a motion of an object, and turning off of an image. In addition, the image analysis engine 100 may perform detection of a background area, detection of a front view and an object, counting of an object, detection of camera tampering, and detection of a face. Also, the image analysis engine 100 may calculate brightness, color, texture, and shape information of an image.

Furthermore, the image analysis engine 100 generates an event in response to the result from performing image analysis satisfying conditions for generating an event. The event may include an event set in a system, such as, an occurrence of a network error, setting of a new camera (not shown), etc. Also, the event may include an event set by a client, for example, in the case of an input image, an appearance of an object, an occurrence of an image specified by a client (for example, appearance of a face that cannot be recognized), a change in screen colors, an occurrence of a motion in a set area, etc., and in the case of a sound source, an occurrence of an abnormal sound source (a skidding sound of a car tire, a glass breaking sound, an alarm sound, a colliding sound, etc.), an occurrence of a sound source specified by a client (for example, a male scream, a female scream, a child crying sound, etc.), an occurrence of a voice equal to or greater than a threshold value. The result of image analysis of the image analysis engine 100 is stored in the second storage unit 400 of the index part (P2).

Figure 2:
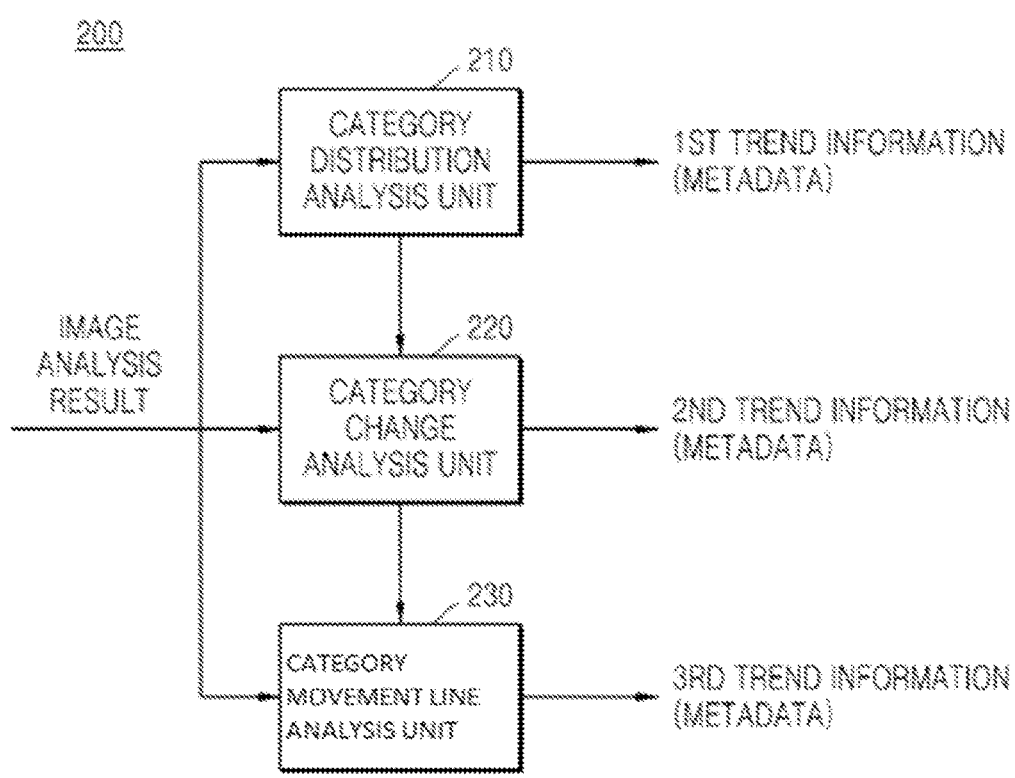
FIG. 2 is a detailed block diagram of a trend analysis engine shown in FIG. 1.

The trend analysis engine 200 analyzes a trend about a category for which the image analysis engine 100 will extract information on a variety of attributes through image analysis, and provides the result of the analysis as trend information. The category may be the type of search word that the client inputs in order to receive a search result. FIG. 2 is a detailed block diagram of the trend analysis engine 200, and may include a category distribution analysis unit 210, a category change analysis unit 220 and a category movement line analysis unit 230.

Referring to FIG. 2, the category distribution analysis unit 210 analyzes, as first trend information, the frequency of occurrences of a category in a random time period. In order to quickly find the frequency of occurrences of a category in a random time period (i.e., in order to quickly calculate first trend information metadata) the category distribution analysis unit 210 performs cumulative hashing. This indicates that the frequency of occurrences of a category input in each time unit includes the sum of the frequencies of occurrences of a category up to the previous time period. When $M_n$ denotes the frequency of occurrences of a category in time n and $H_n$ is the frequency of occurrences of a category actually input, the following equation 1 is derived:

$$H_n = M_n + \Sigma_0^{k-1} M_k \quad (1)$$

According to the equation 1, the sum of frequencies of occurrences of a category between random time intervals is the difference of frequencies of occurrences of the category between the two time points. For example, in response to a client requesting a frequency of occurrences of a category between time intervals t2 and t1 (t2>t1), the frequency of occurrences of the category between the two time intervals (e.g., the frequency $M_d$ of occurrences of the category between the two time intervals and $M_{t2}$ denotes the frequency of occurrences of a category at time t2 and $M_{t1}$ denotes the frequency of occurrences of a category at time t1) is obtained from the following equation 2:

$$M_d = M_{t2} - M_{t1} \quad (2)$$

Through this analysis of distribution of frequencies of occurrences of a category, high-speed identification of a distribution of frequencies of occurrences of a category is enabled without directly accessing the first storage unit 300 and calculating linearly.

Figure 3A:
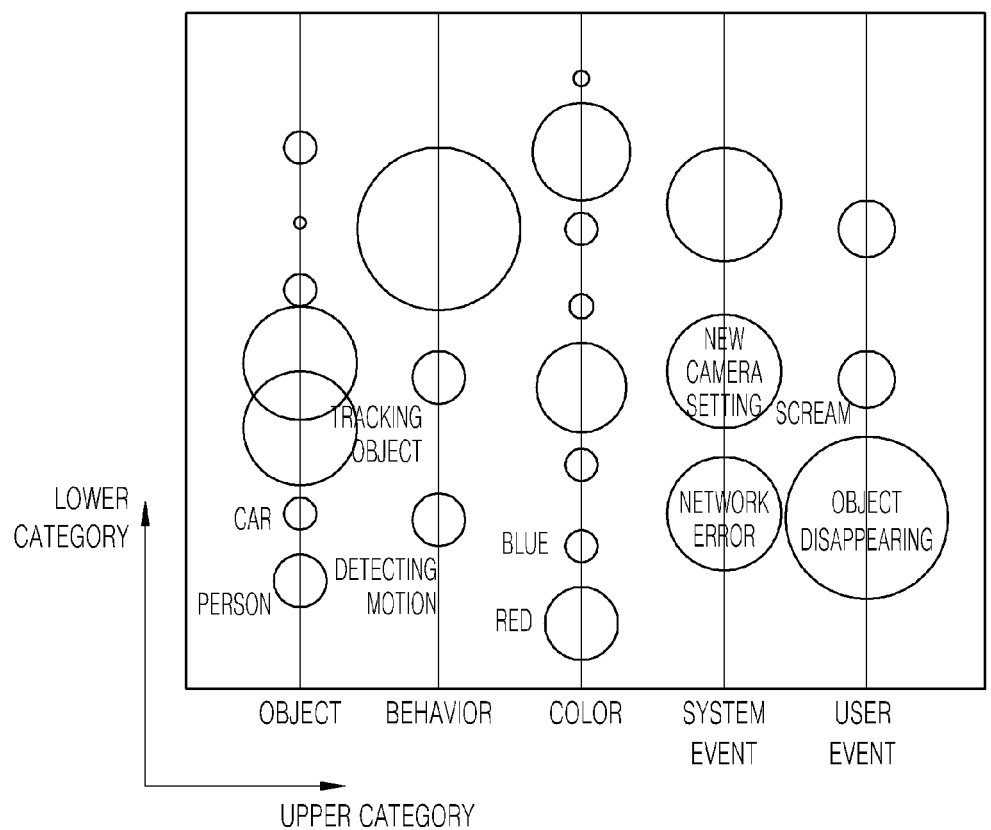
FIGS. 3A-3C show an exemplary embodiment in which a category distribution analysis result is provided to a client in a search part.
Figure 3B:
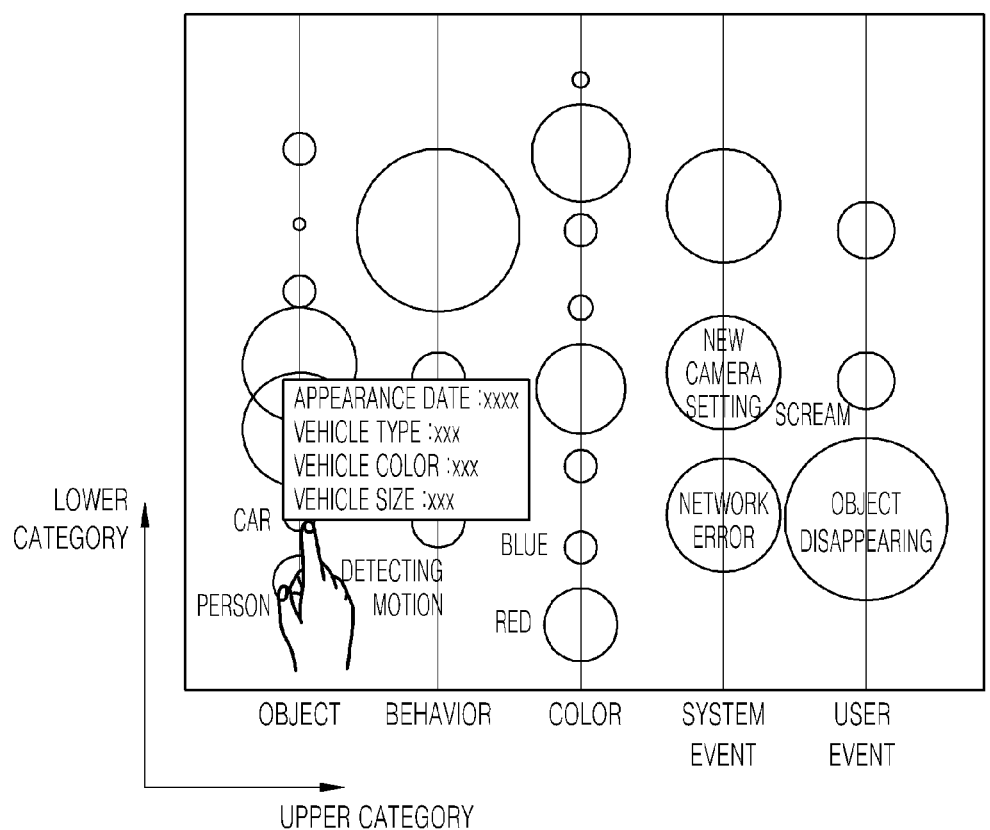

FIGS. 3A and 3B show an exemplary embodiment in which first trend information metadata that is analyzed in a random time period in the category distribution analysis unit 210 is provided to a client via the browsing engine 900.

Referring to FIG. 3A, the first trend information metadata is provided in an output screen format in which upper categories are indicated on the horizontal axis and frequencies of occurrences of lower categories included in each upper category are represented by visual graphics on the vertical axis. The upper categories may include, as the result of the image analysis, object, behavior (e.g., motion), color, system event, and user event (e.g., client event). The lower categories may include a vehicle and a person for an upper category of an object, and red and blue for an upper category of a color.

FIG. 3B shows an exemplary embodiment in which any one category is selected among the lower categories, detailed information of the category is provided. In this exemplary embodiment, when a vehicle is selected among the lower categories, detailed information about the vehicle, such as dates of appearances, and the type, color, size of the vehicle, is provided.

Figure 3C:
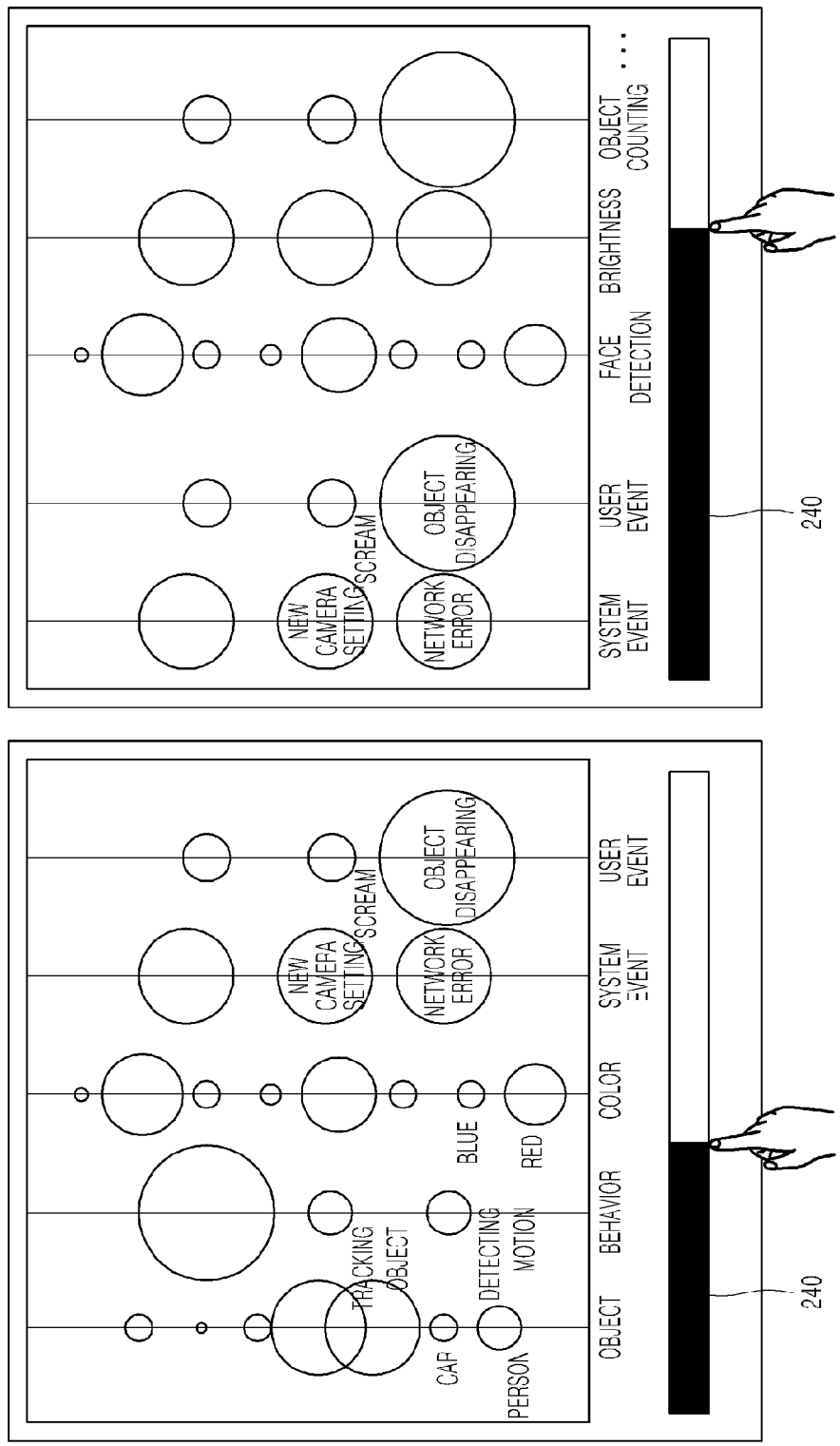

FIG. 3C shows displaying a variety of upper categories and lower categories according to manipulation of a slide bar 340.

The category change analysis unit 220 analyzes the frequency of occurrences of a category in a random time period as first trend information and analyzes a change in the first trend information as second trend information. Also, the category change analysis unit 220 performs cumulative hashing in order to quickly identify a change of the second trend information metadata for a random time intervals (for example, by time, by day of the week, by month, etc.).

Figure 4A:
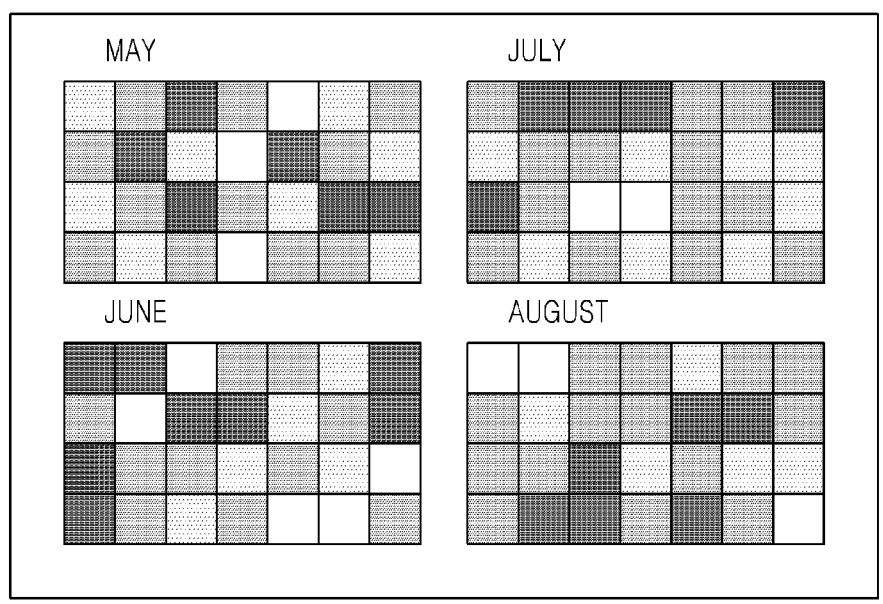
FIGS. 4A-4C show an exemplary embodiment in which a category distribution analysis result is provided to a client in a search part.
Figure 4B:
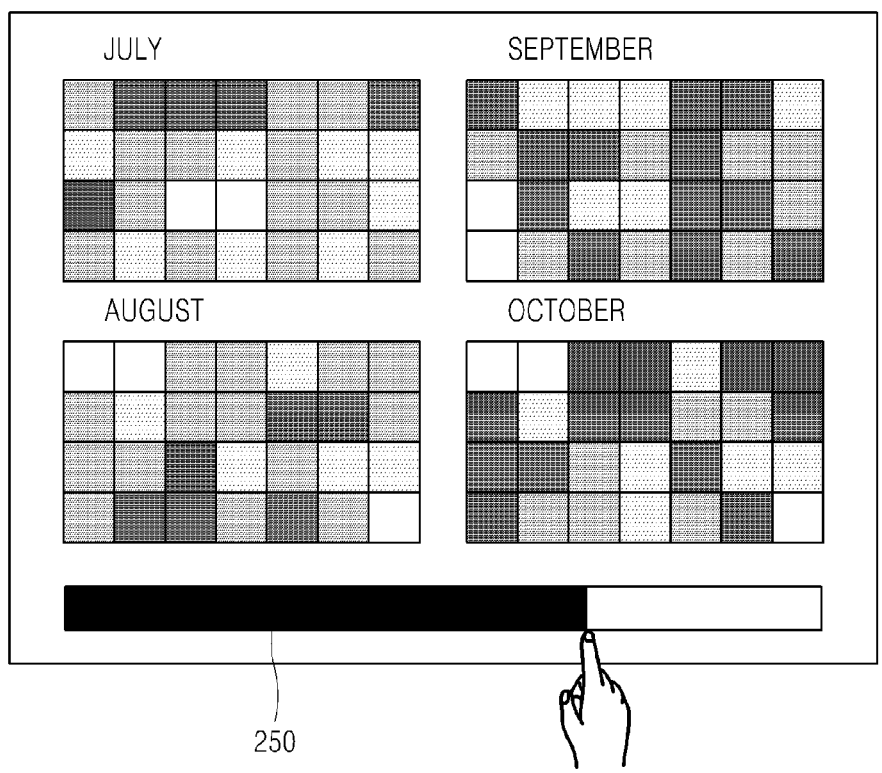
Figure 4C:
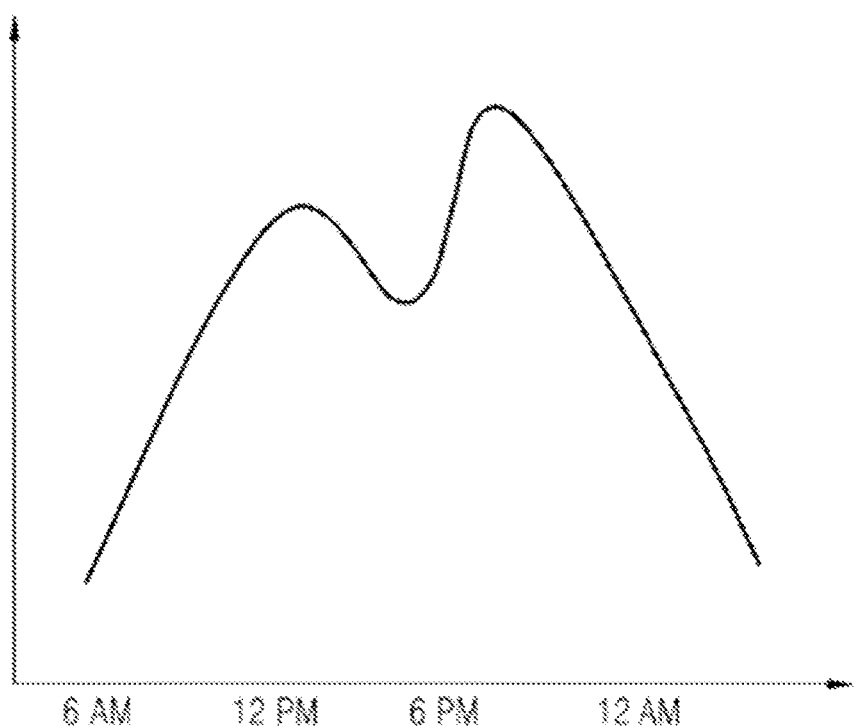

FIGS. 4A-4C show an exemplary embodiment in which the change of the first trend information metadata analyzed in a random time period in the category change analysis unit 220 is provided to a client by processing of the browsing engine 900. FIG. 4A shows an example in which the second trend information metadata is displayed in a heat-map format in units of months. The heat-map is a coined word by combining 'heat' meaning the quality of being hot, and 'map' meaning a drawing of a particular area, and a variety of information items which can be expressed by colors are output in visual graphics in the form of heat distribution. As an exemplary embodiment, an area where the category occurrence frequency is high may be expressed by a red color, and an area where the category occurrence frequency is low may be expressed by a blue color.

In FIG. 4B, the heat-map is formed, not of one screen, but with a plurality of screens, and a slide bar 250 is provided for a client to watch the heat-map arbitrarily. By providing the change in the frequencies of occurrences of the category is provided in the heat-map format, the client can intuitively identify the change in the frequencies of occurrences of the category.

FIG. 4C shows an example in which the second trend metadata information is displayed in a graph format over time units. For example, in an exemplary embodiment the time units are set as 6 AM, 12 PM, 6 PM, and 12 AM. However, the exemplary embodiment is not limited to this and a variety of time unit settings are available. Referring to FIG. 4C, the change in the frequency of occurrences of the category is provided in a graph format expressed in visual graphics over set time. As a result, the client can intuitively identify the change in the frequencies of occurrences of the category.

Figure 5:
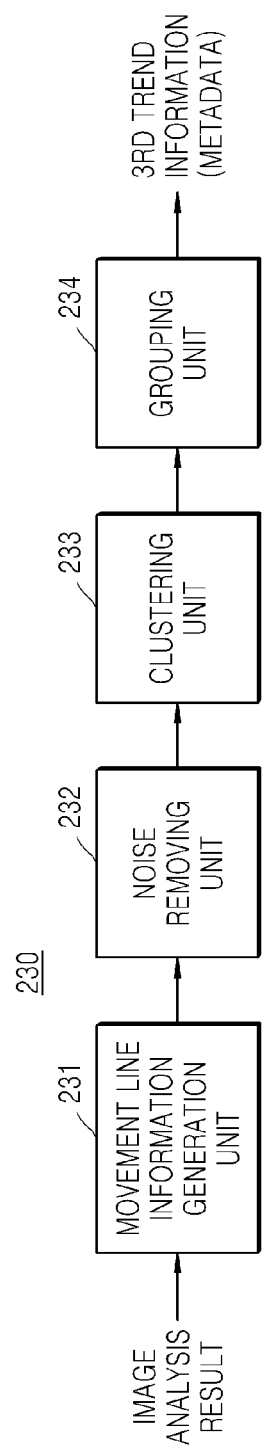
FIG. 5 is a detailed block diagram of a category movement line analysis unit shown in FIG. 2 according an exemplary embodiment of the present disclosure.

The category movement line analysis unit 230 provides a result of movement line analysis of a category as third trend information, through detection and tracking of a motion in the category. FIG. 5 is a detailed block diagram of the category movement line analysis unit 230 according an exemplary embodiment of the present disclosure. Referring to FIG. 5, the category movement line analysis unit 230 includes a movement line information generation unit 231, a noise removing unit 232, an clustering unit 233 and a grouping unit 234.

The movement line information generation unit 231 detects a motion about a category from an image frame being input, tracks the trace of the motion through similarity between frames, and thus generates movement line information.

The noise removing unit 232 removes noise for pattern analysis of the generated movement line information.

The clustering unit 233 makes clusters each formed of similar movement line information items in which noise is removed. In order to make clusters of similar movement line information, the clustering unit 233 applies a topic modeling algorithm and generates a spatial probabilistic model of a movement line by the topic modeling algorithm. The topic modeling is a method of automatic generative modeling which claims that contents can be explained by the probability distribution of a topic in a bag-of-words method. Through this algorithm, a document topic probability distribution is obtained. In order to use this algorithm, the topic of a vocabulary must be determined. The vocabulary may be made to be each position (x, y) or position plus direction. Through this, though two different movement lines may have similar positions of (x, y) on the screen, the aspect that the two different movement lines have different contents in the probability distribution is highlighted.

In a predetermined topic modeling algorithm, the number of topics is not determined beforehand, and by measuring the distribution of data, the number can be automatically determined. However, this algorithm has a disadvantage of a slow speed. In the case of an algorithm for which the number of topics must be determined beforehand, a number of topics that is greater than a proper number of topics that are obtained through learning is used.

The grouping unit 234 provides, as the third trend information, a result of grouping similar movement line information items by performing artificial intelligence neural network learning with the clustered movement line information items. The topic modeling expresses a movement line as a distribution of multiple topics. Accordingly, movement lines different from each other may be compared through similarity of probability distributions. However, there is a possibility that the number of topics is not optimized, and due to the characteristics of the topic modeling, similar movement lines may be distributed in categories different from each other. That is, it is difficult to provide intuitive information to a client. Accordingly, in the present exemplary embodiment, the result of clustering through topic modeling is optimized by applying a self-organizing map (SOM) to the clustering result. For example, the SOM may be a type of an unsupervised learning neural network model which is developed by Kohonen and in which an object pattern is not given. The SOM is a method of self-organizing in a feature map by adjusting connection intensity by itself in order to make a cluster of similar input patterns. The reason why the optimization is performed by applying the SOM to the clustering result is that the SOM outputs a topic map keeping a topology characteristic. Accordingly, the client can easily identify how many types of representative movement lines exist on the screen.

Figure 6A:
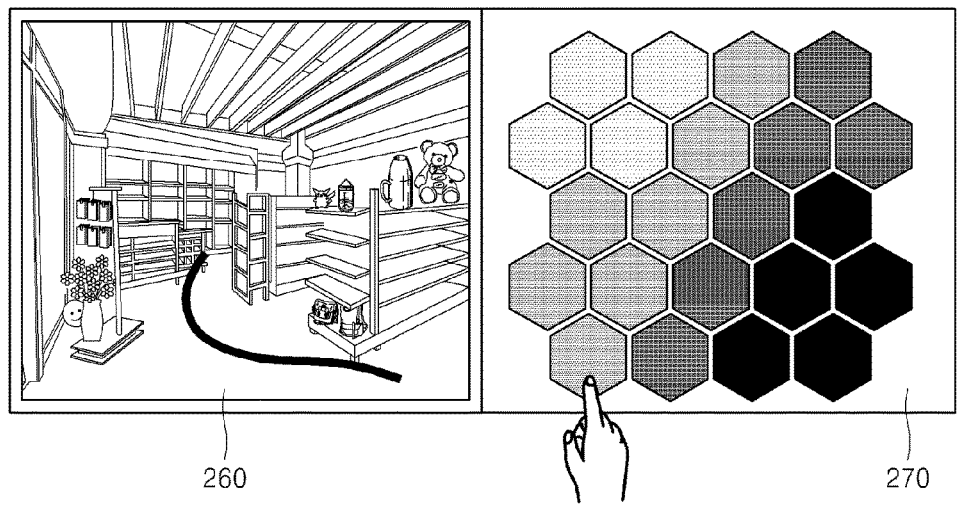
FIGS. 6A and 6B show an exemplary embodiment in which a category movement line analysis result by the category movement line analysis unit shown in FIG. 5 is provided to a client.
Figure 6B:
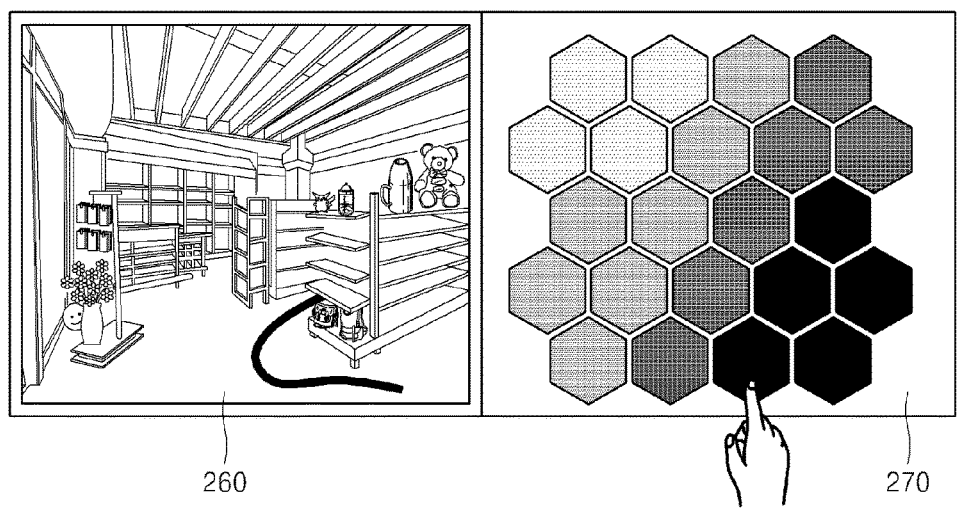

FIGS. 6A and 6B show an exemplary embodiment in which the third trend information metadata, which is analyzed in the category movement line analysis unit 230, is provided to the client by processing of the browsing engine 900. Referring to FIG. 6A, the third trend information metadata is provided in an output screen format. The output screen is formed with a first area 260 and a second area 270. The first area 260 displays a movement line in an image. The second area 270 displays a topic map in which similar movement line information items are grouped. In response to the client selecting any one group (topic) in the second area 270, a movement line corresponding to the selected group is displayed in the first area 260. FIG. 6B shows an example in which the client selects another group (topic) in the second area 270 and the movement line corresponding to the selected group is displayed in the first area 260.

Figure 7:
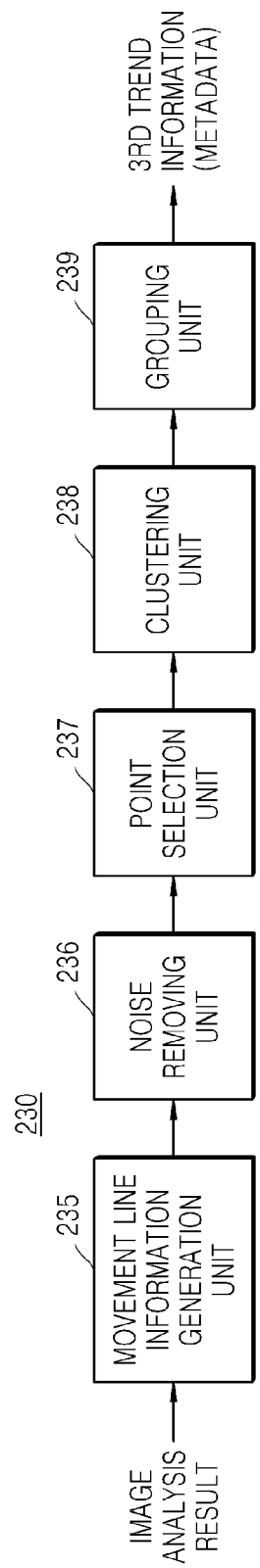
FIG. 7 is a detailed block diagram of a category movement line analysis unit shown in FIG. 2 according to another exemplary embodiment of the present disclosure.

FIG. 7 is a detailed block diagram of a category movement line analysis unit 230 according to another exemplary embodiment. Referring to FIG. 7, the category movement line analysis unit 230 includes a movement line information generation unit 235, a noise removing unit 236, a point selection unit 237, a clustering unit 238, and a movement probability calculation unit 239.

The movement line information generation unit 235 generates movement line information, by detecting a motion about a category in an image frame being input and tracking the trace through similarity between frames. The noise removing unit 236 removes noise for pattern analysis of the generated movement line information. The point selection unit 237 selects arbitrary points included in the movement line information in which noise is removed. For example, a condition for selecting points having greater changes in directions may be selected. As another example, start point and an end point may be selected as points included in movement line information, and an arbitrary point having more changes in direction may be selected. The clustering unit 238 makes clusters formed of similar movement line information items including the points. As detailed explanation of the clustering unit 238 is shown above, it will be omitted here. The movement probability calculation unit 239 calculates a probability of moving from any one clustered point to another clustered point, and provides the probability as the third trend information.

Figure 8:
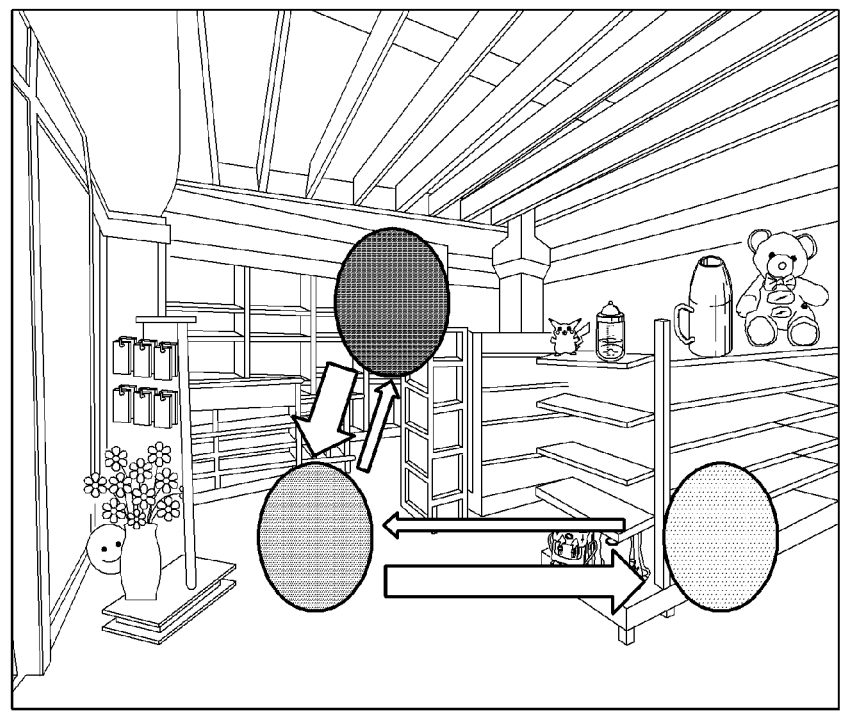
FIG. 8 shows an exemplary embodiment in which a category movement line analysis result by the category movement line analysis unit shown in FIG. 7 is provided to a client.

FIG. 8 shows an exemplary embodiment in which the third trend information metadata analyzed in the category movement line analysis unit 230 is provided to the client by processing of the browsing engine 900. Referring to FIG. 8, the third trend information metadata is provided in an output screen format, and the output screen displays clustered points in an image and the probability of moving from any one point to another point as an arrow. Here, the magnitude of the movement probability is in proportion to the size of the arrow.

Referring back to FIG. 1, the first storage unit 300 stores the first through third trend information provided from the trend analysis engine 200, as metadata.

In response to the operation of the preliminary data analysis part (P1) being completed like this, the indexing engine 500 structuralizes and organizes the metadata stored in the first storage unit 300 in order to make the metadata easily searchable, and then the processed metadata is stored in the third storage unit 600. The second storage unit 400 stores the image analysis result of the image analysis engine 100.

In response to the operations of the preliminary data analysis part (P1) and the indexing part (P2) being completed, the query engine 700 classifies a search word input by the client into a category. For example, the query engine 700 may receive trend information that is related to a search word for searching trend information from the client, and classify the search word. The search engine 800 searches the third storage unit 600 and the second storage unit 400 for contents corresponding to the classified category. The browsing engine 900 provides the client with the search result of the trend information of the search engine 800 in a predetermined format.

As described above according to the exemplary embodiment of the present disclosure, instead of the related art processes for analyzing the requirement of a client and finding items, the search system identifies contents formed in data, analyzes a trend, and provides the trend to a client. Accordingly, the client can identify a search result more intuitively.

Figure 9:
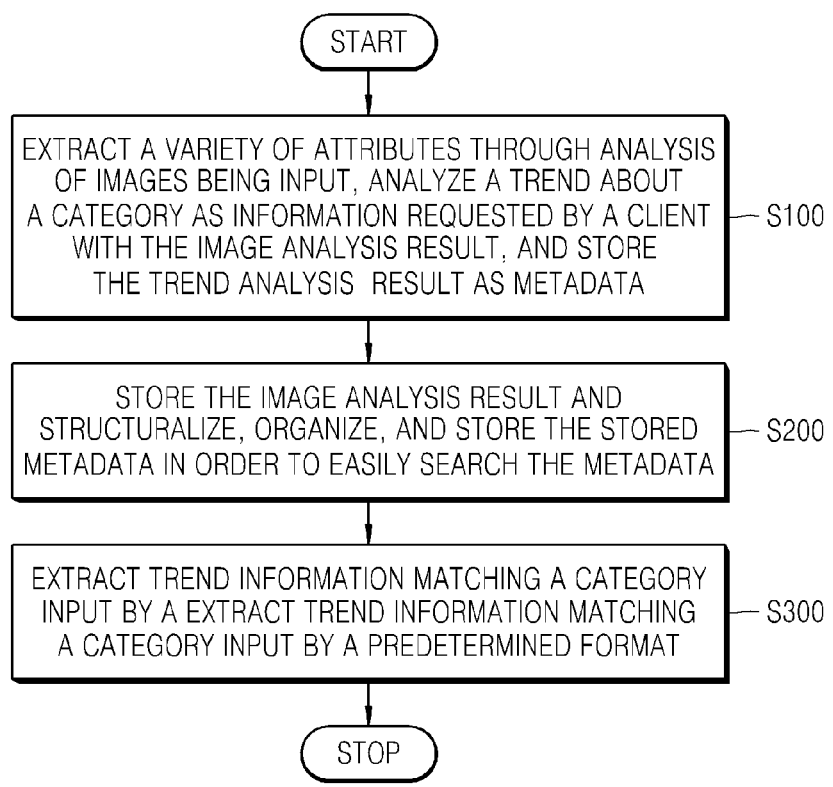
FIG. 9 is a flowchart of a method of operating a search system according to an exemplary embodiment of the present disclosure.

FIG. 9 is a flowchart of a method of operating a search system according to an exemplary embodiment of the present disclosure.

The preliminary data analysis part (P1) performs an operation S100 for extracting a variety of attributes through analysis of images being input, analyzing a trend about a category as information requested by a client with the image analysis result, and storing the trend analysis result as metadata.

The preliminary data analysis part (P1) extracts a variety of attributes through analysis of image data being input, analyzes a trend of a category for which a variety of attribute information is extracted through image analysis, and provides the analysis result as trend information. Here, the category may be a type of a search word that a client inputs in order to receive a search result. Also, the preliminary data analysis unit (P1) analyzes the frequency of occurrences of a category in a random time period as first trend information and provides the result in an output screen format. In the output screen, upper categories are indicated on the horizontal axis and frequencies of occurrences of lower categories included in each upper category are represented by visual graphics on the vertical axis. The preliminary data analysis part (P1) analyzes the frequency of occurrences of a category in a random time period as the first trend information, analyzes a change in the first trend information as second trend information, and displays the analysis result in a heat-map format in a predetermined time unit or in a graph format. Furthermore, the preliminary data analysis part (P1) provides the movement line analysis result of the category as the third trend information, through detection and tracking of a motion about the category.

The movement line analysis of the preliminary data analysis part (P1) includes two exemplary embodiments. In the first exemplary embodiment, a motion related to a category is detected from an image frame being input, and through similarity between frames, the trace is tracked, thus generating movement line information. Noise in the generated movement line information is removed and clusters formed of similar movement line information items in which noise is removed are made. Then, by performing artificial intelligence neural network learning with the clustered movement line information items, similar movement line information items are grouped and the grouped result is provided as the third trend information. Here, the third trend information is provided to the client in an output screen format which is formed with a first area which displays a movement line in an image and a second area which displays a topic map in which similar movement line information items are grouped. In response to the client selecting any one group (topic) in the second area, a movement line corresponding to the selected group is displayed in the first area.

In another exemplary embodiment, the movement line information is generated by detecting a motion related to a category from an image frame that is input, and the trace is tracked through the similarity between image frames. Noise in the generated movement line information is removed. Then, arbitrary points, which are included in the movement line information in which noise is removed, are selected. Then, movement line information items similar to each other including the selected points are clustered. The probability of moving from any one clustered point to another clustered point is calculated and provided as the third trend information. The third trend information is provided to the client in an output screen format, and the output screen displays clustered points in an image and the probability of moving from any one point to another point as an arrow. The magnitude of the movement probability is in proportion to the size of the arrow.

In response to the operation of the preliminary data analysis part (P1) being completed, the indexing part (P2) makes the metadata stored in the preliminary data analysis part (P1) easily searchable by structuralizing (e.g., adding structure and organization), and storing the metadata in operation S200.

In response to the operations of the preliminary data analysis part (P1) and the indexing part (P2) being completed, the search part (P3) classifies a search word input by the client into a category, searches the indexing part (P2) for contents corresponding to the classified category, and provides the client with the search result of the trend information in a predetermined format.

Other exemplary embodiments of the present disclosure can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit stream according to one or more exemplary embodiments of the present disclosure. The media may also be a distributed network, so that the computer readable code is stored/transferred and executed in a distributed fashion. Also, functional programs, codes, and code segments for accomplishing the present disclosure can be easily construed by programmers skilled in the art to which the present disclosure pertains.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A system for search comprising at least one processor to implement:
    a preliminary data analysis part configured to analyze input images to extract a variety of attributes, analyze a trend about a category of information requested by a client by using the extracted variety of attributes, and store, based on trend analysis, trend information as metadata;
    an index part configured to make the metadata searchable by structuralizing the metadata and storing the structuralized metadata; and
    a search part configured to extract the trend information matching the category of information requested by the client from the searchable metadata and provide the trend information in a predetermined format,
    wherein the preliminary data analysis part comprises:
        an occurrence frequency analysis unit configured to analyze, as first trend information of the trend information, an occurrence frequency of the category in a random time period;
        a change analysis unit configured to analyze, as second trend information of the trend information, a change in the first trend information with respect to a set time; and
        a movement line analysis unit configured to provide, as third trend information of the trend information, a result of movement line analysis of the category, through detection and tracking of a motion in the category.

2. The system of claim 1, wherein the preliminary data analysis part further comprises:
    an image analysis engine configured to analyze the input images and extract the variety of attributes; and
    a first storage unit configured to store the trend information as the metadata.

3. The system of claim 2, wherein the index part comprises:
    a second storage unit configured to store an output of the image analysis engine;
    an indexing engine configured to structuralize and organize metadata stored in the first storage unit to make the metadata searchable; and
    a third storage unit configured to store the searchable metadata from the indexing engine.

4. The system of claim 3, wherein the search part comprises:
    a query engine configured to classify a search word input from the client into a category;
    a search engine configured to search the second and third storage units for trend information corresponding to the classified category; and
    a browsing engine configured to provide a search result of the trend information by the search engine in the predetermined format.

5. The system of claim 1, wherein the search part is configured to provide metadata of the first trend information, analyzed by the occurrence frequency analysis unit, in an output screen format that includes upper categories indicated on one axis and, on another axis, visual graphics representing frequencies of occurrences of lower categories included in each upper category.

6. The system of claim 5, wherein, in response to a random lower category being selected from among the lower categories, detailed information of the selected lower category is displayed.

7. The system of claim 1, wherein the search part is configured to provide metadata of the second trend information, in a heat-map format in which a change in occurrence frequencies with respect to the set time is expressed in visual graphics of a heat distribution form.

8. The system of claim 1, wherein the search part is configured to provide metadata of the second trend information by changing the first trend information, analyzed by the occurrence frequency analysis unit, to the second trend information, in a graph format in which a change in occurrence frequencies with respect to the set time is expressed in visual graphics.

9. The system of claim 1, wherein the movement line analysis unit comprises:
a movement line information generation unit configured to generate movement line information through motion detection and tracking in relation to the category from the input images;
a noise removing unit configured to remove noise of the movement line information;
a clustering unit configured to make clusters each of which is formed of similar movement line information items in which the noise is removed; and
a grouping unit configured to provide, as the third trend information, a result of grouping similar movement line information items by performing artificial intelligence neural network learning with the clustered movement line information items.

10. The system of claim 9, wherein the search part is configured to provide metadata of the third trend information, which is retrieved from the index part, in an output screen format which is formed with a first area where a movement line in an image is displayed and a second area where the result of grouping similar movement line information items by performing artificial intelligence neural network learning is displayed as a self-organizing map.

11. The system of claim 10, wherein, in response to any one group being selected in the second area, a movement line corresponding to the selected group is displayed in the first area.

12. The system of claim 1, wherein the movement line analysis unit comprises:
a movement line information generation unit configured to generate movement line information through motion detection and tracking in relation to the category from the input images;
a noise removing unit configured to remove noise of the movement line information;
a point selection unit configured to select arbitrary points included in the movement line information in which the noise is removed;
a clustering unit configured to make clusters each of which is formed of similar movement line information items including the points; and
a movement probability calculation unit configured to calculate a probability of moving from any one clustered point to another clustered point, and provide the probability as the third trend information.

13. The system of claim 12, wherein metadata of the third trend information retrieved from the index part is provided in an output screen format in which clustered points in an image are displayed and the probability of moving from any one clustered point to the another clustered point is shown as an arrow.

14. The system of claim 13, a magnitude of the probability of moving is proportional to a size of the arrow.

15. A method for operating a system for search, the method comprising:
extracting, for preliminary data analysis, a variety of attributes by analyzing input images, analyzing a trend about a category of information requested by a client by using the extracted variety of attributes, and storing, based on trend analysis, trend information as metadata;
indexing the stored metadata by structuralizing the metadata and storing the structured metadata to make the metadata searchable; and
extracting, from the searchable metadata, the trend information matching a category input by the client, and providing the extracted trend information in a predetermined format,
wherein the analyzing the trend about the category comprises:
analyzing, as first trend information of the trend information, an occurrence frequency of the category in a random time period;
analyzing, as second trend information of the trend information, a change in the first trend information with respect to a set time, and
providing, as third trend information of the trend information, a result of movement line analysis of the category, through detection and tracking of a motion in the category.

16. The method of claim 15, wherein the extracting the variety of attributes comprises extracting the variety of attributes through analysis of the input images, and
wherein the analyzing the trend about the category further comprises, in response to the variety of attributes being extracted, analyzing the trend about the category and providing the trend analysis as the trend information.

17. The method of claim 15, wherein the providing of the result of movement line analysis comprises:
generating movement line information through motion detection and tracking in relation to the category from the input images;
removing noise of the movement line information;
making clusters each of which is formed of similar movement line information items in which the noise is removed; and
providing, as the third trend information, a result of grouping similar movement line information items by performing artificial intelligence neural network learning with the clustered movement line information items.

18. The method of claim 15, wherein the providing of the result of movement line analysis comprises:
generating movement line information through motion detection and tracking in relation to the category from the input images;
removing noise of the movement line information;
selecting arbitrary points included in the movement line information in which the noise is removed;
making clusters each of which is formed of similar movement line information items including the points; and calculating a probability of moving from any one clustered point to another clustered point, and providing the probability as the third trend information.

\* \* \* \* \*